United States Patent Office 3,644,302
Patented Feb. 22, 1972

3,644,302
PREPARATION OF THERMOSTABILISABLE POLYTHIIRANES
Adrien Nicco and Bernard Boucheron, Bethune, France, assignors to Societe Ethylene-Plastique, Paris, France
No Drawing. Filed Dec. 10, 1968, Ser. No. 782,746
Claims priority, application Great Britain, Dec. 14, 1967, 56,856/67
Int. Cl. C08f 1/04, 1/74
U.S. Cl. 260—79 R     9 Claims

ABSTRACT OF THE DISCLOSURE

A process for the preparation of thermostabilisable polythiiranes in which is used at least one monomer selected from compounds of the group of thiirane and products obtained by substituting in thiirane at least one hydrogen atom by one alkyl radical having from 1 to 4 carbon atoms, characterized in that at least one phenyl phosphine out of the three phosphorus valences is used as a catalyst and that polymerization is effected in the absence of solvent or in the presence of at least one aprotic solvent, and the polymers thus obtained.

---

This invention relates to a process for the preparation of thermostabilisable polythiiranes.

Suggestions have previously been made for polymerising thiirane (ethylene sulphide), or various substituted homologues thereof, with cationic or anionic catalysts, but most of these attempts have resulted in the production of polythiiranes which cannot be stabilised against heat and consequently cannot be transformed and/or which are very discoloured after melting.

We have now discovered that the polymerisation of thiiranes with triphenylphosphines, unsubstituted or substituted; as catalyst, in bulk or in various aprotic media gives polymers much more stable and much less coloured after melting. The degree of thermostabilisation depends on the composition of the polymerisation medium and the catalyst (under normal polymerisation conditions), and generally varies inversely with the apparent density of the powdered polymer.

In the polymerisation process it is possible to use, as monomer, thiirane or a thiirane obtained by substitution of one of its hydrogen atoms by an alkyl radical having 1 to 4 carbon atoms. It is also possible to make copolymers by use of a mixture of two of these monomers.

The aprotic solvents are polar or non-polar.

Suitable aprotic polar solvents are, for example, dimethyl sulphoxide, hexamethyl orthophosphotriamide, dimethyl formamide, acetonitrile, and tetramethylene sulphone. These solvents may be used alone or as a mixture of two or more thereof, or mixed with one or more aprotic inert solvents, such as aliphatic or aromatic hydrocarbons or the less reactive halogenated derivatives thereof, such as chlorophene, or with cyclic or other ethers, for example diethyl oxide and oxolane, or ketones, for example propanone. When two or more solvents are used, they may be miscible or immiscible, but it is preferred that they be miscible with each other.

It is also possible to use, in the polymerisation media, a small quantity of protonic substance which, in a known manner, acts as a transfer agent and modifies the molecular weight of the polymer synthetised. This substance is, for example, an alcohol (methanol) or a thiol (ethanethiol) or a mercaptoalcohol.

The preferred catalyst is triphenyl phosphine, but substituted derivatives thereof may be used. Thus one or more of the phenyl radicals may be alkylated or polyalkylated as, for example, in tri(tolyl)phosphines, tri(xylyl)phosphines, ter(butyl)phenyl phosphines, and the three substituted phenyl radicals may be the same or different. Among the tri(alkyl)phenyl phosphines, triphenyl phosphine gives particularly good results.

Triphenyl phosphine gives excellent results when, as media, there is used either a mixture of toluene and dimethyl sulphoxide, or tetramethylene sulphone.

It is unexpected that triphenyl phosphines should catalyse the polymerisation of thiiranes since triphenylamines, arsines, and stibines, and N,N-dimethyl aniline do not catalyse the polymerisation.

Preferably, from 0.005 to 0.1 millimoles of catalyst are used per gram of thiirane or substituted homologue thereof.

The stability of the polymer is measured by extruding the polymer in a plastograph at 215° C. according to the procedure of ASTM D 1238-58 T. This test shows the period during which the viscosimetric molecular weight remains constant, i.e. the stability period.

There are two different types of polymer stability, namely the intrinsic stability (of the crude product) and the stability after dispersion of a stabiliser therein.

We have found that in general there is no relation between these two types of stability, that is to say an intrinsically stable polymer may not be stabilisable (by the addition of a stabiliser), and vice versa. We have also found that the stability after the addition of a stabiliser is an intrinsic property of polymers, so that a polymer will be stabilisable (or not) independent of the particular stabiliser used.

The polythiiranes produced by the process of this invention are stabilisable by the addition of stabilisers, such as the nitrogenous compounds described in Belgian patent specification No. 645,691. The freshly-prepared polythiirane powder is moistened with a solution of the nitrogenous compound in a suitable liquid for example water, or an alcohol or amine. The paste obtained is dried and, when dry, the powdered polymer is homogenised to disperse the stabiliser.

The following examples are given by way of illustration only. The melting points reported were measured on the heating stage of a microscope operating in polarised light.

EXAMPLE 1

20 ml. of a mixture of 3 parts toluene and 1 part dimethyl sulphoxide, and 2.5 ml. of a solution of triphenyl phosphine in dimethyl sulphoxide (200 mM./l.) were introduced into a 2-litre flask provided with a stainless-steel mechanical stirrer, a reflux condenser, a dropping funnel, for adding substances to the flask, and various accessories required for maintaining a nitrogen atmosphere containing no oxygen or water in the flask. 100 g. of thiirane was then gradually introduced, dissolved in 1 litre of the same mixture of toluene and dimethyl sulphoxide, over a period of one hour. Polymerisation began at ambient temperature, 15 minutes after the monomer was first added. The temperature was then kept between 35° and 40° C. for 2 hours. Stirring was continued for 1 hour 30 minutes and the reaction was then complete. Methanol was added and the polymer separated from the mixture of methanol and polymerisation dispersants by filtration. The polymer was washed with water and subjected to steam distillation to remove toluene and dimethyl sulphoxane. The product was then dried in vacuo at 80° C.

90 g. polythiirane were obtained, melting between 204° and 208° C., with a mass per unit volume of powder of 70 g./l. and a stability of 7 minutes.

Part of this product was mixed with 2.5% by weight of 3,3'-ethylenediamino - bis - propionamide (stabiliser). After treatment in this manner, the polythiirane was stable for 1 hour 44 minutes and was slightly grey coloured after extrusion.

EXAMPLE 2

Example 1 was repeated using 5 times the amount of monomer and solvents, and 13 times the amount of catalyst there specified. Initiation was effected at 35° C. The monomer was introduced into the flask over a period of 1 hour, and the temperature was kept at 40° C. Polymerisation began 30 minutes after the monomer was added. After 2 hours, it was found that 70% of the monomer had been polymerised (80% after 5 hours).

Polymerisation was stopped after 20 hours and the polymer was washed in water and dried in vacuo at 80° C. 470 g. polythiirane were obtained, melting between 205° and 210° C., with a mass per unit volume of powder of 70 g./l. The product was stable for 2 minutes and was white coloured after extrusion. After being treated with stabiliser as in Example 1, the product was stable for 40 minutes and ivory-coloured after extrusion.

EXAMPLE 3

Example 1 was repeated using 20 g. thiirane, 0.1 mM. triphenyl phosphine and 200 ml. tetramethylene-sulphone, but without any toluene or dimethyl sulphoxide. After the mixture had been left for 45 minutes at ambient temperature, no change was observed except that the mixture had become turbid. After the mixture had been heated to 30° C., polymerisation started properly, and the reaction was continued for 2 hours 30 minutes at 40° C. and the mixture was left overnight at ambient temperature.

The polymer was washed in water and dried in vacuo at 80° C. 19 g. of polythiirane were obtained, melting between 203 and 206° C., with a mass per unit volume of powder of 140 g./l. The product was stable for 3 minutes and white-coloured after extrusion; after treatment with stabiliser as in Example 1, the product was stable for 44 minutes and ivory-coloured after extrusion.

EXAMPLE 4

300 ml. of a mixture of 85% by volume of toluene and 15% by volume of dimethyl sulphoxide, and 112 ml. of a solution of triphenyl phosphine in dimethyl sulphoxide (100 millimole/litre), were introduced into a glass reactor provided with an efficient stirrer and accessory equipment for maintaining an atmosphere of pure, dry nitrogen in it, the reactor being placed in a temperature-controlled bath.

The mixture was stirred and heated to 40° C. and during the subsequent course of the reaction, the temperature was kept between 40° and 48° C.

100 ml. of a mixture of 675 ml. dimethyl sulphoxide, 3825 ml. toluene and 450 g. thiirane were then introduced. The reaction began immediately, accompanied by turbidity. The mixture was added over a period of 17 minutes.

The extent of polymerisation was measured chromatographically; after 1 hour, the proportion of monomer polymerised was 0.85, after 2 hours 0.90, and after 6 hours 0.97. Polymerisation was then stopped. The polymer was filtered off, washed in water and methanol, and dried in vacuo at 80° C.

The product melted at 202° to 205° C. and had a mass per unit volume of powder of 100 g./l. The pure substance was stable for 2 minutes, and for 46 minutes after being mixed with stabiliser as in Example 1. It was ivory-coloured after extrusion.

EXAMPLE 5

The process of Example 4 was repeated under the following conditions:

133.2 ml. of a solution of triphenyl phosphine in dimethyl sulphoxide (169 millimole/litre) was used;

The monomer solution was introduced over a period of 9 minutes; the temperature was kept between 40 and 43° C.; and polymerisation was stopped after 6 hours.

450 g. of polythiirane was obtained, melting at 202° to 204° C., and with a mass per unit volume of powder of 100 g./l. The pure polymer was stable for 2 minutes. After treatment with stabiliser, it was stable for 240 minutes at 225° C., and was yellow-coloured after extrusion.

EXAMPLE 6

The process of Example 4 was repeated under the following conditions:

24 ml. of a solution of triphenyl phosphine in dimethyl sulphoxide (200 millimoles/litre) was used;

A solution of 500 g. thiirane in 3750 ml. toluene and 1250 ml. dimethyl sulphoxide was added over a period of 3 hours.

The initiation temperature of 24° C. was raised to between 35° and 42° C. during polymerisation, first by regulating the rate at which the monomer solution was added, and later by heating.

Polymerisation was allowed to continue for about 10 hours.

The conversion rate (proportion of monomer polymerised) was 0.99. The polymer obtained, which was granular, was crushed to a powder having a density of 490 g./l. The substance was stable for about 2 minutes when pure, and for 73 minutes after stabilisation.

When N,N-dimethyl aniline, triphenyl amine, triphenyl arsine or triphenyl stibine were used to catalyse polymerisation under the conditions described, the products obtained had a very low melting point of between 130° and 150° C. depending on the catalyst. These polymers, which are of very little use industrially, were very difficult to stabilise; their stability after dispersion of the stabiliser therein did not exceed 20 minutes.

EXAMPLE 7

100 ml. toluene and 0.4 millimole triphenyl phosphine were introduced into apparatus similar to that used in Example 1 (but having a magnetic stirrer coated with polytetrafluoroethylene). The mixture was heated to and kept at 40° C. 20 ml. thiirane were then gradually added. Polymerisation started 5 minutes after the monomer was first added. One hour later, the temperature was raised to 50° C. and polymerisation was continued for 18 hours.

5 g. polythiirane were obtained, melting at approximately 200° C. After stabilisation (as in Example 1), the polymer was stable for at least 27 minutes, as the fluidity index was still constant at the end of this period, when the product had been completely extruded. The product was ivory-coloured after extrusion.

EXAMPLE 8

(Bulk polymerisation)

550 ml. thiirane was introduced under nitrogen into a 1-liter flask provided with a mechanical stirrer. The thiirane was cooled to 0° C. and 13 mg. triphenyl phosphine were added. Polymerisation began 13 minutes after the components had been mixed. After 2 hours 30 minutes, the temperature was allowed to rise from 0° to 18° C.

The polymer obtained was then dried in vacuo at 70° C. and weighed 30 g. Its melting point was considerably above 210° C.

We claim:

1. A process for polymerizing a monomer of thiirane or a homologue thereof in which one hydrogen atom is substituted by an alkyl radical of 1 to 4 carbon atoms to form a homopolymer of said monomer or a copolymer of a mixture of two of said monomers which comprises polymerizing said monomer or mixture of two of said monomers in the presence of a catalytic amount of triphenyl phosphine or an alkyl-substituted triphenyl phosphine.

2. A process according to claim 1 in which the polymerization is made in bulk.

3. A process according to claim 1 in which the polymerization is made in an aprotic media.

4. A process according to claim 1, wherein a tri(tolyl)phosphine, a tri(xylyl)phosphine or a tri(butyl-phenyl) phosphine is used as the catalyst.

5. A process according to claim 1, wherein from 0.005 to 0.1 millimole of catalyst is used per gram of thiirane or substituted homologue thereof.

6. A process according to claim 3 wherein the aprotic media is dimethyl sulphoxide, hexamethyl orthophosphotriamide, dimethyl formamide, acetonitrile or tetramethylene sulphone, or a mixture of two or more thereof.

7. A process according to claim 3 wherein the media is an aprotic non polar solvent selected from the group consisting of an aliphatic hydrocarbon, aromatic hydrocarbon, an ether and a ketone.

8. A process according to claim 3 wherein the media is a mixture of an aprotic polar solvent and an aprotic nonpolar solvent.

9. A process according to claim 3 wherein thiirane is polymerized in the presence of triphenyl phosphine, as catalyst, and in the presence of dimethyl sulphoxide as an aprotic polar solvent, and an aromatic hydrocarbon as an aprotic nonpolar solvent.

References Cited

UNITED STATES PATENTS

| | | | |
|---|---|---|---|
| 2,768,153 | 10/1956 | Shokal | 260—91.1 |
| 2,981,716 | 4/1961 | Street et al. | 260—45.7 |
| 3,039,999 | 6/1962 | Linville et al. | 260—45.7 |
| 3,055,861 | 9/1962 | Hersh et al. | 260—45.7 |
| 3,248,362 | 4/1966 | Perry | 260—45.7 |
| 3,317,489 | 5/1967 | Sander | 260—79 |
| 3,448,091 | 6/1969 | Cohran | 260—79 |

FOREIGN PATENTS

| | | | |
|---|---|---|---|
| 736,026 | 6/1966 | Canada | 260—45.9 |

DONALD E. CZAJA, Primary Examiner

V. P. HOKE, Assistant Examiner

U.S. Cl. X.R.

260—30.8 DS, 45.7 P, 45.9 R